United States Patent
Ma et al.

(10) Patent No.: US 12,346,137 B2
(45) Date of Patent: Jul. 1, 2025

(54) METHOD AND SYSTEM FOR COLLABORATIVE HEAVE COMPENSATION CONTROL OF A DUAL SHIP-MOUNTED HOISTING ARM SYSTEM

(71) Applicant: Shandong University, Jinan (CN)

(72) Inventors: Xin Ma, Jinan (CN); Fuhao Wang, Jinan (CN)

(73) Assignee: Shandong University, Jinan (CN)

( * ) Notice: Subject to any disclaimer, the term of this patent is extended or adjusted under 35 U.S.C. 154(b) by 0 days.

(21) Appl. No.: 18/886,699

(22) Filed: Sep. 16, 2024

(65) Prior Publication Data

US 2025/0068189 A1    Feb. 27, 2025

(30) Foreign Application Priority Data

Mar. 29, 2024   (CN) .......................... 202410376514.0

(51) Int. Cl.
   *G05D 3/20*    (2006.01)
   *B63B 39/02*   (2006.01)

(52) U.S. Cl.
   CPC ............... *G05D 3/20* (2013.01); *B63B 39/02* (2013.01)

(58) Field of Classification Search
   None
   See application file for complete search history.

(56) References Cited

U.S. PATENT DOCUMENTS 2,309,715 A * 2/1943 Rudow .................. B63B 27/22
                                                     198/588
3,150,860 A * 9/1964 Nelson .................... B66D 1/48
                                                     114/244

(Continued)

FOREIGN PATENT DOCUMENTS

CN       110426954 A       11/2019
CN       114212704 A        3/2022

(Continued)

OTHER PUBLICATIONS

Ke Fan et al., "Extended Disturbance Observer Based Adaptive Robust Control for Active Heave Compensator", Chinese Hydraulics & Pneumatics, No. 7, Jul. 14, 2020, pp. 22-27.

(Continued)

*Primary Examiner* — Daniel L Greene

(57) ABSTRACT

A method for collaborative heave compensation control of a dual ship-mounted hoisting arm system including two vertical hoisting arms and two horizontal hoisting arms is provided, in which a dynamic model of the hoisting arm system is constructed based on hoisting arm position and velocity and an attitude angle of a load of the hoisting arm system; and based on the dynamic model, an optimal control strategy is obtained according to a control objective and an optimization objective under multiple constraint conditions to control the hoisting arm action, where the control objective is to track a hoisting arm reference compensation trajectory during the heave motion, the optimization objective is to minimize a tracking error, and the constraint conditions include a hoisting arm action constraint, and a position and velocity constraint of each hoisting arm after action. A system for implementing such method is also provided.

7 Claims, 4 Drawing Sheets

(56) References Cited

U.S. PATENT DOCUMENTS

| | | | | |
|---|---|---|---|---|
| 3,913,757 | A * | 10/1975 | Lovey | B64F 1/322 |
| | | | | 318/648 |
| 4,021,019 | A * | 5/1977 | Sanders | B63B 27/10 |
| | | | | 254/281 |
| 8,195,368 | B1 * | 6/2012 | Leban | B63B 27/10 |
| | | | | 212/277 |
| 2009/0187527 | A1 * | 7/2009 | Mcaree | G01G 19/08 |
| | | | | 702/174 |
| 2021/0070408 | A1 * | 3/2021 | Taylor | B63C 3/12 |
| 2022/0259013 | A1 * | 8/2022 | Schiele | B66C 1/108 |
| 2022/0411234 | A1 * | 12/2022 | Vihonen | B66C 13/085 |
| 2023/0107388 | A1 * | 4/2023 | Feng | B66C 13/48 |
| | | | | 700/28 |
| 2023/0399205 | A1 * | 12/2023 | Zhang | B66C 13/48 |
| 2024/0109757 | A1 * | 4/2024 | Takaki | B66C 13/46 |

FOREIGN PATENT DOCUMENTS

| | | |
|---|---|---|
| CN | 117724339 A | 3/2024 |
| WO | 2021012962 A1 | 1/2021 |

OTHER PUBLICATIONS

Zhaolong Zeng et al., "Trajectory tracking and load anti-sway control for ship-borne special crane", Journal of Harbin Engineering University, vol. 26, No. 4, Aug. 30, 2005, pp. 457-461.

* cited by examiner

Constructing a dynamic model of the dual ship-mounted hoisting arm system according to a first state variable and a second state variable, where the first state variable includes position and velocity of each hoisting arm; and the second state variable is an attitude angle of the load, and is expressed based on the hoisting arm position and hoisting arm velocity

Based on the dynamic model, obtaining an optimal control strategy according to a control objective and an optimization objective under multiple constraint conditions to control action of the hoisting arm, where the control objective is to track a reference compensation trajectory of the hoisting arm; the optimization objective is to minimize a tracking error; and the constraint conditions include an action constraint of the hoisting arm and a position and velocity constraint of the hoisting arm after action

Fig. 1

METHOD AND SYSTEM FOR COLLABORATIVE HEAVE COMPENSATION CONTROL OF A DUAL SHIP-MOUNTED HOISTING ARM SYSTEM

CROSS-REFERENCE TO RELATED APPLICATIONS

This application claims the benefit of priority from Chinese Patent Application No. 202410376514.0, filed on Mar. 29, 2024. The content of the aforementioned application, including any intervening amendments thereto, is incorporated herein by reference in its entirety.

TECHNICAL FIELD

This application relates to motion control of ship-mounted hoists, and more particularly to a method and system for collaborative heave compensation control of a dual ship-mounted hoisting arm system.

BACKGROUND

The description provided herein only provides background technical information related to this application, and does not necessarily constitute the prior art.

Ship-mounted hoist has been widely used in the cargo transportation, offshore drilling platform control, and assembly and disassembly of offshore facilities (e.g., offshore wind power platform). Some control strategies for onshore hoists cannot be directly applied to the ship-mounted hoists because of the following reasons. First, the wave response will be transmitted to the ship, which will make the action of the ship very complex (the 6-degree of freedom (6-DOF) action of the ship includes action in three directions (swell, sway, and undulation) and rotation action around three axes (rolling, pitching, and yawing)). Second, the ship-mounted hoist has more complex dynamic characteristics, and is highly coupled with the ship motion. Continuous wave interference will make the swing angle of the payload complex. When lifting, lowering or stabilizing the load offshore, the wave compensation control can be used to eliminate the load wave action caused by the ship, so as to decouple the load action from the ship motion.

In recent years, considerable attention has been paid to the modeling and wave compensation control of the ship-mounted hoist. For example, the wave information measured by the sensor is combined with the Kalman filter algorithm to predict the wave action within a finite time range, and the wave compensation is performed by a feedforward controller based on the predicted motion. In addition, a system decoupling method is designed to develop a new adaptive sliding mode control (ASMC) method based on the compound sliding-mode surface formed by combination of the internal coupling dynamics (the actuating variable and the non-actuating variable), including two adaptive algorithms: switching control and equivalent control.

Most of the researches related to the ship-mounted hoist focus on the anti-sway control of cable hoists, that is, the transfer of small and medium loads. For the complete transfer of very large loads, such as offshore drilling platform, and offshore wind power platform, two ships and multiple hoists may be needed owing to the extremely high loads and complex maritime interference, making the modelling and control of cable hoists extremely difficult.

SUMMARY

In order to solve the above problems, this application provides a method and system for collaborative heave compensation control of a dual ship-mounted hoisting arm system. The collaborative heave compensation control is performed based on an incremental model predictive control algorithm with minimization of a tracking error as an optimization objective to track the reference trajectory under a preset constraint, so as to enable the heave compensation control under continuous wave interference and improve the heave compensation control performance.

In order to realize the above objectives, technical solutions of this application are described as follows.

In a first aspect, this application provides a method for collaborative heave compensation control of a dual ship-mounted hoisting arm system, the dual ship-mounted hoisting arm system comprising a first vertical hoisting arm, a second vertical hoisting arm, a first horizontal hoisting arm and a second horizontal hoisting arm, and the method comprising:

constructing a dynamical model of the dual ship-mounted hoisting arm system according to a first state variable and a second state variable; wherein the first state variable represents a position and velocity of each of the first vertical hoisting arm, the second vertical hoisting arm, the first horizontal hoisting arm and the second horizontal hoisting arm; and the second state variable is an attitude angle of a load of the dual ship-mounted hoisting arm system, and is expressed based on the position and velocity of each of the first vertical hoisting arm, the second vertical hoisting arm, the first horizontal hoisting arm and the second horizontal hoisting arm;

based on the dynamical model, obtaining an optimal control strategy according to a control objective and an optimization objective under a plurality of constraint conditions; wherein the control objective is to track a reference compensation trajectory of each of the first vertical hoisting arm, the second vertical hoisting arm, the first horizontal hoisting arm and the second horizontal hoisting arm during a heave action process; the optimization objective is to minimize a tracking error; and the plurality of constraint conditions comprise an action constraint of each of the first vertical hoisting arm, the second vertical hoisting arm, the first horizontal hoisting arm and the second horizontal hoisting arm and a position and velocity constraint of each of the first vertical hoisting arm, the second vertical hoisting arm, the first horizontal hoisting arm and the second horizontal hoisting arm after action; and controlling an action of each of the first vertical hoisting arm, the second vertical hoisting arm, the first horizontal hoisting arm and the second horizontal hoisting arm.

In an embodiment, the attitude angle α of the load is expressed as:

$\dot{\alpha} = \dot{g}(a_1)\dot{a}_1 + \dot{g}(b_1)\dot{b}_1 + \dot{g}(b_2)\dot{b}_2 + \dot{g}(a_2)\dot{a}_2$; and the dynamical model is simplified into:

$$M(q_i)\ddot{q}_i + C(q_i, \dot{q}_i)\dot{q}_i + G(q_i) = f_i \ \ i = 1, 2, 3, 4;$$

$$M(q_i) = N^T M(q_j)N, \ C(q_i, \dot{q}_i) = N^T C(q_j, \dot{q}_j)N;$$

$$G(q_i) = N^T G(q_j), \ f_i = N^T f_j; \text{ and}$$

$$N = \begin{bmatrix} 1 & 0 & 0 & 0 \\ 0 & 1 & 0 & 0 \\ 0 & 0 & 1 & 0 \\ 0 & 0 & 0 & 1 \\ \dot{g}(a_1) & \dot{g}(b_1) & \dot{g}(b_2) & \dot{g}(a_2) \end{bmatrix};$$

wherein $a_1$ represents a stroke of the first horizontal hoisting arm; $a_2$ represents a stroke of the second horizontal hoisting arm; $b_1$ represents a stroke of the first vertical hoisting arm; $b_2$ represents a stroke of the second vertical hoisting arm; $\dot{a}_1$ represents a velocity of the first horizontal hoisting arm; $\dot{a}_2$ represents a velocity of the second horizontal hoisting arm; $\dot{b}_1$ represents a velocity of the first vertical hoisting arm; $\dot{b}_2$ represents a velocity of the second vertical hoisting arm; $\dot{g}(a_1)$ represents a partial derivative of a function associated with hoisting arm stroke and the attitude angle of the load with respect to $a_1$; $\dot{g}(a_2)$ represents a partial derivative of the function with respect to $a_2$; $\dot{g}(b_1)$ represents a partial derivative of the function with respect to $b_1$; $\dot{g}(b_2)$ represents a partial derivative of the function with respect to $b_2$; $q_i=[a_1, b_1, a_2, b_2]$ represents the position of each hoisting arm; $M(q_i)$ represents an inertia matrix; $C(q_i, \dot{q}_i)$ represents a Coriolis matrix; $G(q_i)$ represents a gravity matrix; $f_i$ represents a control vector; $\ddot{q}_i$ represents a second-order derivative of $q_i$; and $\dot{q}_i$ represents a first-order derivative of $q_i$.

In an embodiment, $q_i$ is transformed into the first state variable $q_t$ through dimension expansion, expressed as:

$$q_t=[a_1,\dot{a}_1,b_1,\dot{b}_1,b_2,\dot{b}_2,a_2,\dot{a}_2]^T; \text{ and}$$

a state equation is expressed as:

$$\dot{q}_t = F + Gf_i;$$

wherein $f(i) = M(q_i)^{-1}(-C(q_i, \dot{q}_i)\dot{q}_i - G(q_i));$ $g(i) = M(q_i)^{-1}f_i, i = 1, 2, 3, 4;$ $F = [\dot{a}_1; f(1); \dot{b}_1; f(2); \dot{b}_2; f(3); \dot{a}_2; f(4)];$ $G = [0_{1\times 4}; g(1); 0_{1\times 4}; g(2); 0_{1\times 4}; g(3); 0_{1\times 4}; g(4)];$ and $$F \in R^{8\times 1}, G \in R^{8\times 4};$$

wherein F represents a dimension-expanded state transition matrix; G represents a dimension-expanded input matrix; f(1), f(2), f(3) and f(4) represent row vectors of a matrix f(i); and g(1), g(2), g(3) and g(4) represent row vectors of a matrix g(i).

In an embodiment, the method further comprises:
subjecting the dynamic model to approximate linearization based on a real-time state variable and a real-time action input to obtain an approximately-linearized model; and
discretizing the approximately-linearized model in a state space to obtain a discretized model;
wherein the state equation of the approximately-linearized model is expressed as:

$$\dot{q}_t = A_{(t)}q_t + B_{(t)}f_i; \text{ and}$$

$$\begin{cases} A_{(t)} = \nabla_{q_t^*} [F + Gf_i]|_{(q_t^*, f_i^*)} \\ B_{(t)} = \nabla_{f_i^*} [F + Gf_i]|_{(q_t^*, f_i^*)} \\ A_{(t)} \in R^{8\times 8}, B_{(t)} \in R^{8\times 4} \end{cases};$$

wherein $q_t^*$ represents the real-time state variable; $f_i^*$ represents the real-time action input; A and B are discretized state-space model matrices; $q_t$ represents the first state variable; $f_i$ represents the control vector; $\dot{q}_t$ represents a first-order derivative of $q_t$; F represents the dimension-expanded state transition matrix; and G represents the dimension-expanded input matrix; and the discretized model in the state space is expressed as:

$$q(k + 1) = Aq(k) + Bf(k);$$

wherein $q \in R^8$, $f \in R^4$; A and B are matrices of the discretized model, and are obtained by zero-order hold under a given discretization period Ts, respectively expressed as:

$$A = e^{A_{(t)}T_s}; \text{ and}$$

$$B = \int_0^{T_s} e^{A_{(t)}\tau} d\tau B_{(t)}.$$

In an embodiment, the optimization objective is expressed as:

$$J = \frac{1}{2}q_a(N_p)^T S_a q_a(N_p) + \frac{1}{2}\sum_{k=0}^{N_p-1}(q_a(k)^T Q_a q_a(k) + \Delta f(k)^T R \Delta f(k));$$

wherein $\Delta f(k)$ represents an input increment; $q_a$ represents a state equation involving input increment; $N_p$ represents a prediction horizon of model predictive control; $q_a(N_p)$ represents a value of the first state variable after $N_p$ iterative predictions; and $S_a$, $Q_a$ and R are weight matrices.

In an embodiment, the plurality of constraint conditions are respectively expressed as:

$$\begin{cases} q_{min} \leq q(k+i) \leq q_{max} \text{ for } i=1 \ldots N_c \\ \dot{q}_{min} \leq \dot{q}(k+i) \leq \dot{q}_{max} \text{ for } i=1 \ldots N_c \\ f_{min} \leq f(k+i) \leq f_{max} \text{ for } i=1 \ldots N_c \\ \tilde{q}(k) = q_a(k) \\ q_a(k+1) = A_a q_a(k) + B_a \Delta f(k) \text{ for } i=1 \ldots N_c \end{cases};$$

wherein $q_{min}$ represents a minimum hoisting arm position, and $q_{max}$ represents a maximum hoisting arm position; $\dot{q}_{min}$ represents a minimum hoisting arm velocity; $\dot{q}_{max}$ represents a maximum hoisting arm velocity; $f_{min}$ represents a minimum hoisting arm action input; and $f_{max}$ represents a maximum hoisting arm action input; $\tilde{q}(k)$ represents a variation tendency of the first state variable; $q_a(k)$ represents the first state variable involving the input increment at a time k; $q_a(k+1)$ represents the first state variable involving the input increment at a time k+1; $\Delta f(k)$ represents the input increment; $A_a$ represents a state-transition matrix of a state equation of the discretized model; $B_a$ represents an input matrix of the state equation of the discretized model; $q(k+i)$ represents the first state variable involving the input increment at a time k+i; $\dot{q}(k+i)$ represents a first-order derivative of $q(k+i)$; and $f(k+i)$ represents a control input at time k+i.

In a second aspect, this application provides a system for collaborative heave compensation control of a dual ship-mounted hoisting arm system, the dual ship-mounted hoisting arm system comprising a first vertical hoisting arm, a second vertical hoisting arm, a first horizontal hoisting arm and a second horizontal hoisting arm, and the system comprising:

a model building module; and an optimization control module;

wherein the model building module is configured to construct a dynamical model of the dual ship-mounted hoisting arm system according to a first state variable and a second state variable; wherein the first state variable comprises a hoisting arm position and a hoisting arm velocity; and the second state variable is an attitude angle of a load of the dual ship-mounted hoisting arm system, which is expressed based on the hoisting arm position and the hoisting arm velocity; and the optimization control module is configured to obtain an optimal control strategy based on the dynamical model according to a control objective and an optimization objective under a plurality of constraint conditions, and control an action of each of the first vertical hoisting arm, the second vertical hoisting arm, the first horizontal hoisting arm and the second horizontal hoisting arm according to the optimal control strategy; wherein the control objective is to track a reference compensation trajectory of each of the first vertical hoisting arm, the second vertical hoisting arm, the first horizontal hoisting arm and the second horizontal hoisting arm during a heave motion process; the optimization objective is to minimize a tracking error; and the plurality of constraint conditions comprise a hoisting arm action constraint, and a hoisting arm position and velocity constraint after action.

In a third aspect, this application provides an electronic device, comprising:

a memory; and a processor;

wherein a computer instruction is stored in the memory, and is configured to be operated by the processor to implement the method in the first aspect.

In a fourth aspect, this application provides a non-transitory computer-readable storage medium; wherein the non-transitory computer-readable storage medium is configured to store a computer instruction; and the computer instruction is configured to be executed by a processor to implement the method in the first aspect.

In a fifth aspect, this application provides a computer program product, comprising a computer program; wherein the computer program is configured to be executed by a processor to implement the method in the first aspect.

Compared to the prior art, this application has the following beneficial effects.

Regarding the method and system provided herein for collaborative heave compensation control of a dual ship-mounted hoisting arm system, the heave movement of ships under the wave interference is taken into consideration, and a multi-degree-of-freedom non-linear dynamic model of the dual ship-mounted hoisting arm system is established. Based on the system coupling constraint, the attitude angle of the load is represented by the hoisting arm position and velocity, and the dimension of the hoisting arm state variable is expanded.

The hoisting arm position and velocity are taken as the state variable to simplify the non-linear dynamic model of the system, which facilitates the design of the incremental model predictive control algorithm and optimization control.

Regarding the collaborative heave compensation control method provided herein, the reference compensation trajectory of the corresponding hoisting arm is generated based on the heave motion prediction algorithm, and the reference compensation trajectory is tracked based on the dynamic model with "minimizing the tracking error" as optimization objective under the hoisting arm action constraint and the hoisting arm position and velocity constraint after the action. Considering the case that the actuator is unprotected, the performance of the actuator can be fully utilized while meeting the input saturation constraint, realizing the collaborative heave compensation control under the continuous wave interference and improving the performance of the collaborative heave compensation control.

The advantages of additional aspects of this application will be partly described below, and part of the advantages will become apparent from the description below, or from the implementation of the present disclosure.

BRIEF DESCRIPTION OF THE DRAWINGS

The accompanying drawings, as a part of the present disclosure, are provided to further illustrate the present disclosure. The embodiments of the present disclosure and their description are illustrative rather than limiting the present disclosure.

FIG. 1 is a flow chart of a method for collaborative heave compensation control of a dual ship-mounted hoisting arm system according to Embodiment 1.

DETAILED DESCRIPTION OF EMBODIMENTS

Figure 2:
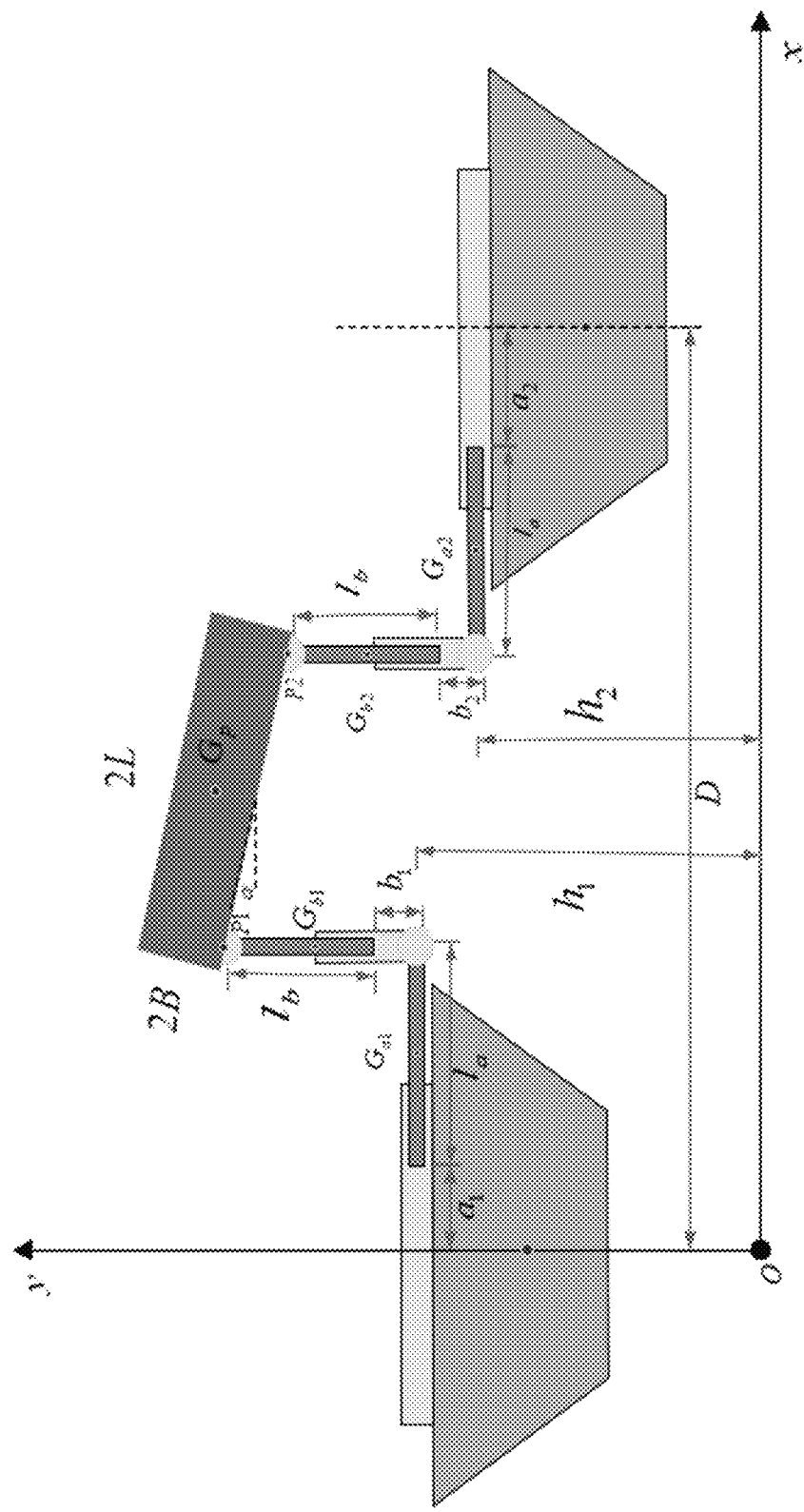
FIG. 2 schematically shows a dynamic model of the dual ship-mounted hoisting arm system according to Embodiment 1.

The present disclosure will be further described with reference to the accompanying drawings and the embodiments of the present disclosure.

It should be noted that described below are only illustrative for further describing the present disclosure. Unless otherwise specified, technical terms used herein have the same meaning as commonly understood by those of ordinary skill in the art.

It should be noted that the terms used herein are only for distinguishment rather than limiting the embodiments of the present disclosure. For example, unless otherwise specified, the singular form is also intended to include the plural form. In addition, it should be noted that the terms "include" and "comprise", and any variations thereof, are intended to indicate non-exclusive inclusions. For example, a process, method, system, product or device including a series of steps or units is not necessarily limited to those steps or units clearly listed, and can include other steps or units that are not clearly listed or are inherent to the process, method, system, product or device.

The embodiments of the present disclosure and the features thereof can be combined with each other without contradictions.

Embodiment 1

Referring to FIG. 1, this embodiment provides a method for collaborative heave compensation control of a dual ship-mounted hoisting arm system, where the dual ship-mounted hoisting arm system includes a first vertical hoisting arm, a second vertical hoisting arm, a first horizontal hoisting arm and a second horizontal hoisting arm.

A dynamical model of the dual ship-mounted hoisting arm system is constructed according to a first state variable and a second state variable; where the first state variable represents a position and velocity of each of the first vertical hoisting arm, the second vertical hoisting arm, the first horizontal hoisting arm and the second horizontal hoisting arm; and the second state variable is an attitude angle of a load of the dual ship-mounted hoisting arm system, and is expressed based on the position and velocity of each of the first vertical hoisting arm, the second vertical hoisting arm, the first horizontal hoisting arm and the second horizontal hoisting arm.

Based on the dynamical model, an optimal control strategy is obtained according to a control objective and an optimization objective under a plurality of constraint conditions; where the control objective is to track a reference compensation trajectory of each of the first vertical hoisting arm, the second vertical hoisting arm, the first horizontal hoisting arm and the second horizontal hoisting arm during a heave motion process; the optimization objective is to minimize a tracking error; and the plurality of constraint conditions include an action constraint of each of the first vertical hoisting arm, the second vertical hoisting arm, the first horizontal hoisting arm and the second horizontal hoisting arm, and a position and velocity constraint of each of the first vertical hoisting arm, the second vertical hoisting arm, the first horizontal hoisting arm and the second horizontal hoisting arm after action.

An action of each of the first vertical hoisting arm, the second vertical hoisting arm, the first horizontal hoisting arm and the second horizontal hoisting arm is controlled.

The method of Embodiment 1 will be described below.

(1) Based on a Lagrange method, a 5-degree of freedom (5-DOF) non-linear dynamical model of the dual ship-mounted hoisting arm system is constructed.

In this embodiment, a rigid hoisting arm is used to replace the cable hoist, and a multi-degree-of-freedom non-linear dynamical model, including the first vertical hoisting arm, the second vertical hoisting arm, the first horizontal hoisting arm and the second horizontal hoisting arm and a 5-DOF load of the dual ship-mounted hoisting arm system is constructed. Based on a constrained simplified dynamical model between the first vertical hoisting arm, the second vertical hoisting arm, the first horizontal hoisting arm and the second horizontal hoisting arm are configured to cooperate to stabilize a large load under wave interference. Referring to FIG. 2, the first vertical hoisting arm, the second vertical hoisting arm, the first horizontal hoisting arm, the second horizontal hoisting arm and the load are defined as $G_{a1}$, $G_{a2}$, $G_{b1}$, $G_{b2}$, and $G_p$. An intersection of the first vertical hoisting arm and the load is defined as $p_1$, and an intersection of the second vertical hoisting arm and the load is defined as $p_2$.

A position system of a ship itself can compensate for rolling, pitching, and yawing caused by control, but cannot compensate for a heave motion caused by wave. Therefore, assumptions are made as follows.

Assumption 1: Relatively transverse position of centers of gravity of two ships are constant and a weight of the load is evenly distributed.

Assumption 2: Vertical wave motion on the ship is within a range, a first-order derivative and second-order derivative of the heave motion are meet the requirements of the following inequation:

$$|h_1| \le u_1, |\dot{h}_1| \le u_2, |\ddot{h}_1| \le u_3, |h_2| \le u_4, \quad (1)$$

$$|\dot{h}_2| \le u_5, |\ddot{h}_2| \le u_6, \text{ for } u_1 \ldots u_6 > 0;$$

where $u_1$-$u_6$ are threshold values.

Based on a coordinate system in FIG. 2, $G_{a1}$, $G_{a2}$, $G_{b1}$, $G_{b2}$, and $G_p$ are expressed as:

$$G_{a1} = (a_1 + \frac{1}{2}l_a, h_1); \quad (2)$$

$$G_{b1} = (a_1 + l_a, h_1 + b_1 + \frac{1}{2}l_b);$$

$$G_{a2} = (D - a_2 - \frac{1}{2}l_b, h_2);$$

$$G_{b2} = (D - a_2 - l_a, h_2 + b_2 + \frac{1}{2}l_b); \text{ and}$$

$$G_P = (\frac{a_1 + D - a_2}{2} + B\cos\alpha, \frac{h_1 + b_1 + h_2 + b_2}{2} + l_b + B\sin\alpha);$$

where $a_1$ represents a stroke of the first horizontal hoisting arm, $a_2$ represents a stroke of the second horizontal hoisting arm, $b_1$ represents a stroke of the first vertical hoisting arm, $b_2$ represents a stroke of the second vertical hoisting arm, and a unit of the strokes is m; $l_a$ represents a length of the first horizontal hoisting arm, $l_b$ represents a length of the second horizontal hoisting arm, and a unit of the lengths is m; $h_1$ represents a heave displacement of a first ship of the two ships, $h_2$ represents a heave displacement of a second ship of the two ships, and a unit of the heave displacements is m; $\alpha$ represents the attitude angle of the load, and a unit of the attitude angle is rad; D represents a distance between the two ships, and a unit of the distance is m; B represents a height of the load, and a unit of the height is m.

A velocity relationship is obtained through differentiating position coordinates of the center of gravity of each of the first vertical hoisting arm, the second vertical hoisting arm, the first horizontal hoisting arm, the second horizontal hoisting arm and a payload (the load). Then a kinetic energy and potential energy of the dual ship-mounted hoisting arm system are calculated;

where the kinetic energy includes a kinetic energy of the first vertical hoisting arm, a kinetic energy of the second vertical hoisting arm, a kinetic energy of the first horizontal hoisting arm, a kinetic energy of the second horizontal hoisting arm and a kinetic energy of the payload (the load); and the kinetic energy is expressed as:

$$T = \frac{1}{2}m_a(v_{a1x}^2 + v_{a1y}^2) + \frac{1}{2}m_b(v_{b1x}^2 + v_{b1y}^2) + \quad (3)$$

$$\frac{1}{2}m_a(v_{a2x}^2 + v_{a2y}^2) + \frac{1}{2}m_b(v_{b2x}^2 + v_{b2y}^2) + \frac{1}{2}m_p(v_{px}^2 + v_{py}^2) =$$

$$\frac{1}{2}m_p\left(\frac{1}{4}\dot{a}_1^2 + \frac{1}{4}\dot{a}_2^2 - \frac{1}{2}\dot{a}_1\dot{a}_2 + B^2\dot{\alpha}^2 - B\sin\alpha\dot{\alpha}\dot{a}_1 + B\sin\alpha\dot{\alpha}\dot{a}_2 + \right.$$

-continued $$\frac{1}{4}\dot{h}_1^2 + \frac{1}{4}\dot{b}_1^2 + \frac{1}{4}\dot{h}_2^2 + \frac{1}{4}\dot{b}_2^2 + \frac{1}{2}\dot{h}_1\dot{b}_1 + \frac{1}{2}\dot{h}_1\dot{h}_2 + \frac{1}{2}\dot{h}_1\dot{b}_2 + B\cos\alpha\dot{\alpha}\dot{h}_1 +$$

$$\frac{1}{2}\dot{h}_2\dot{b}_1 + \frac{1}{2}\dot{b}_1\dot{b}_2 + B\cos\alpha\dot{\alpha}\dot{b}_1 + \frac{1}{2}\dot{h}_2\dot{b}_2 + B\cos\alpha\dot{\alpha}\dot{h}_2 + B\cos\alpha\dot{\alpha}\dot{b}_2 \bigg) +$$

$$\frac{1}{2}m_a\left(\dot{a}_1^2 + \dot{h}_1^2 + \dot{a}_2^2 + \dot{h}_2^2\right) + \frac{1}{2}m_b\left(\dot{a}_1^2 + \dot{h}_1^2 + \dot{b}_1^2 + 2\dot{h}_1\dot{b}_1 + \dot{a}_2^2 + \dot{h}_2^2 + \dot{b}_2^2 + + 2\dot{h}_2\dot{b}_2\right);$$

where $m_a$ represents a weight of each of the first horizontal hoisting arm and the second horizontal hoisting arm, $m_b$ represents a weight of each of the first vertical hoisting arm and the second vertical hoisting arm, $m_p$ represents a weight of the load, and a unit of the weights is t; $v_{a1x}$ represents an x-component of the velocity of the first vertical hoisting arm, and $v_{a1y}$ represents a y-component of the velocity of the first vertical hoisting arm; $v_{a2x}$ represents an x-component of the velocity of the second vertical hoisting arm, and $v_{a1y}$ represents a y-component of the velocity of the second vertical hoisting arm; $v_{b1x}$ represents an x-component of the velocity of the first horizontal hoisting arm, and $v_{b1y}$ represents a y-component of the velocity of the first horizontal hoisting arm; $v_{b2x}$ represents an x-component of the velocity of the second horizontal hoisting arm, and $v_{b2y}$ represents a y-component of the velocity of the second horizontal hoisting arm; and $v_{px}$ represents an x-component of the velocity of the load, and $v_{py}$ represents a y-component of the velocity of the load.

In a similar way, the potential energy is expressed as:

$$V = m_a g(h_1 + h_2) + m_b g(h_1 + b_1 + h_2 + b_2 + L_b) + m_p g\left(\frac{1}{2}h_1 + \frac{1}{2}h_2 + \frac{1}{2}b_1 + \frac{1}{2}b_2 + B\sin\alpha\right). \quad (4)$$

Based on formulas (3) and (4), a Lagrange value is defined as: $\mathcal{L} = T - V$. $q_j = [a_1, b_1, a_2, b_2, \alpha]$ represents a generalized coordinate, that is, the first state variable, and also represents operation range of each of the first vertical hoisting arm, the second vertical hoisting arm, the first horizontal hoisting arm, and the second horizontal hoisting arm and the angle of the load; a generalized force corresponding to the generalized coordinate is expressed as: $f_j = [X_1, X_2, X_3, X_4, 0]$, representing four control input torques of each of the first vertical hoisting arm, the second vertical hoisting arm, the first horizontal hoisting arm, and the second horizontal hoisting arm to represent the action of each of the first vertical hoisting arm, the second vertical hoisting arm, the first horizontal hoisting arm, and the second horizontal hoisting arm;

a Lagrange equation is expressed as:

$$\frac{d}{dt}\left(\frac{\partial \mathcal{L}}{\partial \dot{q}_j}\right) - \frac{\partial \mathcal{L}}{\partial q_j} = f_j \ j = 1, 2, 3, 4, 5; \quad (5)$$

where $X_1$, $X_2$, $X_3$, and $X_4$ are the four control input torques of each of the first vertical hoisting arm, the second vertical hoisting arm, the first horizontal hoisting arm, and the second horizontal hoisting arm.

The dynamical model of the dual ship-mounted hoisting arm system is obtained and is expressed in a compact form by mathematical summarization as:

$$M(q_j)\ddot{q}_j + C(q_j, \dot{q}_j)\dot{q}_j + G(q_j) = f_j \ j = 1, 2, 3, 4, 5; \quad (6)$$

$$M(q_j) \in R^{5\times 5}, C(q_j, \dot{q}_j) \in R^{5\times 5}, q \in R^5, G(q_j) \in R^5, f_j \in R^5;$$

where $M(q_j)$ represents an inertia matrix; $C(q_j, \dot{q}_j)$ represents a Coriolis matrix; represents the first state variable; $G(q_j)$ represents a gravity matrix; and $f_j$ represents a control vector.

The matrices and the control vector can be expressed as:

$$M(q_j) = \begin{bmatrix} m_{11} & 0 & 0 & m_{14} & m_{15} \\ 0 & m_{22} & m_{23} & 0 & m_{25} \\ 0 & m_{32} & m_{33} & 0 & m_{35} \\ m_{41} & 0 & 0 & m_{44} & m_{45} \\ m_{51} & m_{52} & m_{53} & m_{54} & m_{55} \end{bmatrix};$$

$$C(q_j, \dot{q}_j) = \begin{bmatrix} 0 & 0 & 0 & 0 & -\frac{1}{2}m_p B\cos\alpha\dot{\alpha} \\ 0 & 0 & 0 & 0 & -\frac{1}{2}m_p B\sin\alpha\dot{\alpha} \\ 0 & 0 & 0 & 0 & -\frac{1}{2}m_p B\sin\alpha\dot{\alpha} \\ 0 & 0 & 0 & 0 & \frac{1}{2}m_p B\cos\alpha\dot{\alpha} \\ 0 & 0 & 0 & 0 & 0 \end{bmatrix}; \text{ and}$$

$$G(q_j) = \begin{bmatrix} 0 \\ \frac{1}{4}m_p \ddot{h}_1 + \frac{1}{4}m_p \ddot{h}_2 + m_b \ddot{h}_1 + \frac{1}{2}m_b g + \frac{1}{2}m_p g \\ \frac{1}{4}m_p \ddot{h}_1 + \frac{1}{4}m_p \ddot{h}_2 + m_b \ddot{h}_2 + \frac{1}{2}m_b g + \frac{1}{2}m_p g \\ 0 \\ \frac{1}{2}m_p B\cos\alpha \ddot{h}_1 + \frac{1}{2}m_p B\cos\alpha \ddot{h}_2 + m_p g B\cos\alpha \end{bmatrix}.$$

Element of the matrix $M(q_j)$ are expressed as:

$$m_{11} = \frac{1}{4}m_p + m_b + m_a;$$

$$m_{14} = m_{41} = -\frac{1}{4}m_p, m_{15} = m_{51} = -\frac{1}{2}m_p B\sin\alpha, m_{22} = \frac{1}{4}m_p + m_b;$$

$$m_{23} = m_{32} = \frac{1}{4}m_p, m_{25} = m_{52} = \frac{1}{2}m_p B\cos\alpha, m_{33} = \frac{1}{4}m_p + m_b; \text{ and}$$

$$m_{44} = \frac{1}{4}m_p + m_b + m_a, m_{45} = m_{54} = \frac{1}{2}m_p B\sin\alpha, m_{55} = m_p B^2.$$

According to definitions of matrices $M(q_j)$ and $C(q_j, \dot{q}_j)$, properties of the matrices is obtained by algebraic operation.

Property 1: The matrix $M(q_j)$ a is positive definite.
Property 2:

$$\frac{1}{2}\dot{M}(q_j) - C(q_j, \dot{q}_j)$$

is skew symmetrical, and is expressed as:

$$\forall \chi \in R^{5\times 1}, \chi^T \left[\frac{1}{2}\dot{M}(q_j) - C(q_j, \dot{q}_j)\right]\chi = 0. \quad (7)$$

The two properties are helpful for design and analysis of a controller of the dual ship-mounted hoisting arm system.

The two properties can also prove that:

$$\forall \chi \in R^{5\times 1}, \chi^T\left[\frac{1}{2}\dot{M}(q_j) - C(q_j, \dot{q}_j)\right]\chi = 0. \quad (7)$$

(2) Model Transition

The dual ship-mounted hoisting arm system has a certain of coupling constraint, and an order of the dynamical model can be simplified by a system constraint to reduce control difficulties.

The system constraint of the dual ship-mounted hoisting arm system is expressed as:

$$h_1 + b_1 - h_2 - b_2 - 2L\sin\alpha = 0. \quad (8)$$

In a case that without losing a generality, a functional relationship between the strokes of each of the first vertical hoisting arm, the second vertical hoisting arm, the first horizontal hoisting arm and the second horizontal hoisting arm and the attitude angle of the load is assumed as:

$$\alpha = g(a_1, b_1, b_2, a_2). \quad (9)$$

Based on the constraint formulas (8) and (9), partial derivatives of $a_1$, $b_1$, $b_2$, $a_2$ in formula (9) are expressed as:

$$\begin{cases} \dot{g}(a_1) = \dot{g}(a_2) = 0 \\ \dot{g}(b_1) = \dfrac{1}{2L\cos\alpha} \\ \dot{g}(b_2) = \dfrac{-1}{2L\cos\alpha} \end{cases} \quad (10)$$

Therefore, $\alpha$ is obtained by subjecting to derivation of formula (9) with respect to time t and integration, and is expressed as:

$$\dot{\alpha} = \dot{g}(a_1)\dot{a}_1 + \dot{g}(b_1)\dot{b}_1 + \dot{g}(b_2)\dot{b}_2 + \dot{g}(a_2)\dot{a}_2;$$

and is expressed in a compact form as:

$$\begin{bmatrix} \dot{a}_1 \\ \dot{b}_1 \\ \dot{b}_2 \\ \dot{a}_2 \\ \dot{\alpha} \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \\ \dot{g}(a_1) & \dot{g}(b_1) & \dot{g}(b_2) & \dot{g}(a_2) \end{bmatrix} \begin{bmatrix} \dot{a}_1 \\ \dot{b}_1 \\ \dot{b}_2 \\ \dot{a}_2 \end{bmatrix} = N\begin{bmatrix} \dot{a}_1 \\ \dot{b}_1 \\ \dot{b}_2 \\ \dot{a}_2 \end{bmatrix}. \quad (11)$$

A simplified dynamical model is expressed as:

$$M(q_i)\ddot{q}_i + C(q_i, \dot{q}_i)\dot{q}_i + G(q_i) = f_i \quad i = 1, 2, 3, 4; \quad (12)$$

where $\dot{g}(a_1)$ represents a partial derivative of a function associated with hoisting arm stroke and the attitude angle of the load with respect to $a_1$; $\dot{g}(a_2)$ represents a partial derivative of the function with respect to $a_2$; $\dot{g}(b_1)$ represents a partial derivative of the function with respect to $b_1$; $\dot{g}(b_2)$ represents a partial derivative of the function with respect to $b_2$; $q_i=[a_1, b_1, a_2, b_2]$ represents the position of each hoisting arm; $\ddot{q}_i$ represents a second-order derivative of $q_i$; and $\dot{q}_i$ represents a first-order derivative of $q_i$.

A constraint of a height change of the load is added as:

$$M(q_i) = N^T M(q_j) N, \; C(q_i, \dot{q}_i) = N^T C(q_j, \dot{q}_j) N; \text{ and}$$

$$G(q_i) = N^T G(q_j), \; f_i = N^T f_j;$$

according to the formula (11), the matrix N is expressed as:

$$N = \begin{bmatrix} 1 & 0 & 0 & 0 \\ 0 & 1 & 0 & 0 \\ 0 & 0 & 1 & 0 \\ 0 & 0 & 0 & 1 \\ \dot{g}(a_1) & \dot{g}(b_1) & \dot{g}(b_2) & \dot{g}(a_2) \end{bmatrix}.$$

Since simplification process is similar to making an implicit function (system constraint) explicit, accuracy of the system dynamical model will not be affected.

Based on the simplified dynamical model, a state-space model is expressed as:

$$\ddot{q}_i = f(i) + g(i)f_i \quad i = 1, 2, 3, 4; \quad (13)$$

where $$f(i) \triangleq M(q_i)^{-1}(-C(q_i, \dot{q}_i)\dot{q}_i - G(q_i)), \; g(i) \triangleq M(q_i)^{-1}, \; i = 1, 2, 3, 4,$$

that is, $$\ddot{q}_i = M(q_i)^{-1}(f_i - C(q_i, \dot{q}_i)\dot{q}_i - G(q_i)) \quad i = 1, 2, 3, 4.$$

$q_i$ is transformed into the first state variable $q_t$ through dimension expansion, expressed as:

$$q_t = [a_1, \dot{a}_1, b_1, \dot{b}_1, b_2, \dot{b}_2, a_2, \dot{a}_2]^T;$$

where $\dot{a}_1$, $\dot{a}_2$, $\dot{b}_1$, $\dot{b}_2$ represent the velocities of each of the first vertical hoisting arm, the second vertical hoisting arm, the first horizontal hoisting arm and the second horizontal hoisting arm.

According to formula (13), a state equation is expressed:

$$\dot{q}_t = F + Gf_i; \quad (14)$$

where $$F = [\dot{a}_1; f(1); \dot{b}_1; f(2); \dot{b}_2; f(3); \dot{a}_2; f(4)];$$

-continued $$G = [0_{1\times 4}; g(1); 0_{1\times 4}; g(2); 0_{1\times 4}; g(3); 0_{1\times 4}; g(4)]; \text{ and}$$

$$F \in R^{8\times 1}, G \in R^{8\times 4};$$

where F represents a dimension-expanded state transition matrix; G represents a dimension-expanded input matrix; f(1), f(2), f(3) and f(4) represent row vectors of a matrix f(i); and g(1), g(2), g(3) and g(4) represent row vectors of a matrix g(i).

This embodiment is devoted to a study of the collaborative heave compensation control. The system exhibits relatively less non-linear characteristics, therefore, the system state equation is subjected to approximate linearization around a real-time operation point $(q_t^*, f_i^*)$.

The dynamic model is subjected to approximate linearization based on a real-time state variable and a real-time action input to obtain an approximately-linearized model. The approximately-linearized model is discretized in a state space to obtain a discretized model. A state equation of the approximately-linearized model is expressed as:

$$\dot{q}_t = A_{(t)} q_t + B_{(t)} f_i; \text{ and} \quad (15)$$

$$\begin{cases} A_{(t)} = \nabla_{q_t^*} [F + G f_i] |_{(q_t^*, f_i^*)} \\ B_{(t)} = \nabla_{f_i^*} [F + G f_i] |_{(q_t^*, f_i^*)}; \\ A_{(t)} \in R^{8\times 8}, B_{(t)} \in R^{8\times 4} \end{cases} \quad (16)$$

where $q_t^*$ represents the real-time state variable, and $f_i^*$ represents the real-time action input; $A_{(t)}$ represents the system matrix after system linearization, and $B_{(t)}$ represents the control matrix after system linearization; $q_t$ represents the first state variable; $f_i$ represents a control vector; $\dot{q}_t$ represents a first-order derivative of $q_t$; F represents a dimension-expanded state transition matrix; and G represents a dimension-expanded input matrix.

A model predictive control (MPC) algorithm is a model-based discretization method, which is widely used in industrial control. A suitable discrete-time linear system is needed to define the system dynamics in a MPC prediction range. A basic idea is to use a current state and constraint of the system to predict a state and input variable in the future, and solve a first group of optimal control input sequence. Only a first group result of the sequence is selected and is applied to the system, and at a next moment, the same operation is repeated to obtain a second group of optimal control input sequence to realize the control objective.

The discretized model in the state space is expressed as:

$$q(k+1) = Aq(k) + Bf(k); \quad (17)$$

where $q \in R^8$, $f \in R^4$; the matrices A and B are matrices of the discretized model, and are obtained by zero-order hold under a given discretization period Ts, respectively expressed as:

$$A = e^{A_{(t)} T_s}; \text{ and}$$

$$B = \int_0^{T_s} e^{A_{(t)} \tau} d\tau B_{(t)}.$$

(3) Control Objective

Considering that a rigid connection between the hoisting arms and the ship, the motion of the ship will be directly transmitted to the hoisting arms and a hoisting point. Research shows that according to a wave data measured by a sensor in a previous time, a fast Fourier transform (FFT) method and a state estimator are utilized to determine corresponding estimated values, such as amplitude and phase information, so as to predict a future wave action.

Therefore, the control objective is described as follows.

(1) Based on a wave-ship heave predictive algorithm, an action trajectory of the ship is subjected to a ship-arm attitude transformation matrix to obtain a corresponding reference compensation trajectory of the each of the first vertical hoisting arm, the second vertical hoisting arm, the first horizontal hoisting arm and the second horizontal hoisting arm during a heave motion process, and the reference compensation trajectory is tracked under an input constraint to perform the collaborative heave compensation, and is expressed as: $q_i(t) = q_{id}(t)$, i=1, 2, 3, 4; where $q_{id}(t)$ represents the reference compensation trajectory of each of the first vertical hoisting arm, the second vertical hoisting arm, the first horizontal hoisting arm and the second horizontal hoisting arm.

(2) A case that an actuator (the first vertical hoisting arm, the second vertical hoisting arm, the first horizontal hoisting arm and the second horizontal hoisting arm) is unprotected is considered to meet an input restriction of the actuator:

$$|f_i| \leq |f_{imax}|;$$

where $f_{imax}$ represents a maximum input meeting a saturation requirement.

An optimal control law meeting the control objective and the constraint condition are obtained.

(4) Design of Controller

Based on the dynamical model and the control objective of the dual ship-mounted hoisting arm system, an incremental model predictive algorithm framework is constructed. The reference trajectory of the first state variable in a discrete state is represented by $q_d(k)$, and the collaborative heave compensation control is realized under an action input at time k f(k).

An input increment $\Delta f(k)$ represents a change of the control input during a sampling time, and is defined as:

$$\Delta f(k) = f(k) - f(k-1); \quad (18)$$

where f(k) represents an action input at time k, and f(k−1) represents an action input at time k−1; $\Delta f(k)$ is configured as a cost in a performance, affecting a velocity change of the control input to generate a smoother control input and avoid a faster change in the system.

Formula (18) is plugged into formula (17) to obtained:

$$q(k+1) = Aq(k) + B\Delta f(k) + Bf(k-1); \quad (19)$$

where q(k) represents the first state variable involving the input increment at a time k, and q(k+1) represents the first state variable involving the input increment at a time k+1.

A dynamic equation of the control objective is expressed as:

$$q_d(k+1) = A_D q_d(k); \qquad (20)$$

where $A_D$ represents an objective state transition matrix.

A new state variable, a new state transition matrix and a new input matrix are defined and expressed as:

$$q_a(k) = [q(k); q_d(k); f(k-1)]; \qquad (21)$$

$$A_a = \begin{bmatrix} A & 0_{8\times 8} & B \\ 0_{8\times 8} & A_D & 0_{8\times 4} \\ 0_{4\times 8} & 0_{4\times 8} & I_{4\times 4} \end{bmatrix}; \text{ and}$$

$$B_a = \begin{bmatrix} B \\ 0_{8\times 4} \\ I_{4\times 4} \end{bmatrix}.$$

According to formulas (19)-(21), a new state-space equation is obtained:

$$q_a(k+1) = A_a q_a(k) + B_a \Delta f(k); \qquad (22)$$

where $q_a(k)$ represents the first state variable at the time k; $q_a(k+1)$ represents the first state variable at the time k+1; $A_a$ represents a new state-transition matrix of the new state equation; and $B_a$ represents a new input matrix of the new state equation.

At time k, a tendency of the first state variable in a prediction horizon $N_p$ of model predictive control is iterated and is expressed as:

$$\tilde{q}(k) = \begin{bmatrix} A \\ A^2 \\ \vdots \\ A^{N_p} \end{bmatrix} q_a(k) + \begin{bmatrix} B & 0 & \cdots & 0 \\ AB & B & \cdots & 0 \\ \vdots & \vdots & \ddots & \vdots \\ A^{N_p-1}B & A^{N_p-1}B & \cdots & B \end{bmatrix} F(k); \text{ and} \qquad (23)$$

$$\begin{cases} \tilde{q}(k) = [q_a(k+1), q_a(k+2) \ldots q_a(k+N_p)]^T \\ F(k) = [\Delta f(k), \Delta f(k+1) \ldots \Delta f(k+N_p-1)]^T \end{cases}; \qquad (24)$$

where $N_p$ represents the prediction horizon of model predictive control; and $A^{N_p}$ represents a matrix A after $N_p$ iterative predictions.

Equations (23)-(24) are expressed in a compact form as:

$$\tilde{q}(k) = \Phi q_a(k) + \Gamma F(k); \qquad (25)$$

where $\tilde{q}(k)$ represents the state variable within all prediction intervals predicted at time k, $F(k)$ represents the sequence of control quantities calculated at time k, $$\Phi = \begin{bmatrix} A \\ A^2 \\ \vdots \\ A^{N_p} \end{bmatrix}, \Gamma = \begin{bmatrix} B & 0 & \cdots & 0 \\ AB & B & \cdots & 0 \\ \vdots & \vdots & \ddots & \vdots \\ A^{N_p-1}B & A^{N_p-1}B & \cdots & B \end{bmatrix}.$$

The state error is defined as:

$$e(k) = q(k) - q_d(k) = [I_{8\times 8} \ -I_{8\times 8} \ 0_{8\times 4}]q_a(k); \qquad (26)$$

where $I_{8\times 8}$ represents an 8 by 8 unit matrix; $-I_{8\times 8}$ represents an 8 by 8 negative unit matrix; and $0_{8\times 4}$ represents an 8 by 4 null matrix.

A matrix $C_a \triangleq [I_{8\times 8} \ -I_{8\times 8} \ 0_{8\times 4}]$ is defined and is obtained:

$$e(k) = C_a q_a(k). \qquad (27)$$

The optimization objective is to minimize the tracking error, and is expressed in formula (28). The plurality of constraint conditions include an action constraint of each of the first vertical hoisting arm, the second vertical hoisting arm, the first horizontal hoisting arm and the second horizontal hoisting arm and a position and velocity constraint of each of the first vertical hoisting arm, the second vertical hoisting arm, the first horizontal hoisting arm and the second horizontal hoisting arm after action, and is expressed in formula (29). A control law is solved by solving the optimization objective. Formulas (28)-(29) are expressed as:

$$J = \frac{1}{2}e(N_p)^T S e(N_p) + \frac{1}{2}\sum_{k=0}^{N_p-1}\left(e(k)^T Q e(k) + \Delta f(k)^T R \Delta f(k)\right); \qquad (28)$$

and $$\begin{cases} \text{s.t. } q_{min} \le q(k+i) \le q_{max} \text{ for } i = 1 \ldots N_p \\ \dot{q}_{min} \le \dot{q}(k+i) \le \dot{q}_{max} \text{ for } i = 1 \ldots N_p \\ f_{min} \le f(k+i) \le f_{max} \text{ for } i = 1 \ldots N_p \\ \tilde{q}(k) = q_a(k) \\ q_a(k+1) = A_a q_a(k) + B_a \Delta f(k) \text{ for } i = 1 \ldots N_p \end{cases} \qquad (29)$$

$C_a^T Q C_a \triangleq Q_a$, and $C_a^T S C_a \triangleq S_a$, are defined and are plugged in formula (28) to obtain a new optimization objective function, and the new optimization objective function is expressed as:

$$J = \frac{1}{2}q_a(N_p)^T S_a q_a(N_p) + \frac{1}{2}\sum_{k=0}^{N_p-1}\left(q_a(k)^T Q_a q_a(k) + \Delta f(k)^T R \Delta f(k)\right); \qquad (30)$$

where $q_a(N_p)$ represents a value of the first state variable after $N_p$ iterative predictions.

In formula (29), a first constraint is the position constraint of each of the first vertical hoisting arm, the second vertical hoisting arm, the first horizontal hoisting arm and the second horizontal hoisting arm after action, and is configured to limit an operation range of each of the first vertical hoisting arm, the second vertical hoisting arm, the first horizontal hoisting arm and the second horizontal hoisting arm. A second constraint is the velocity constraint of each of the first vertical hoisting arm, the second vertical hoisting arm, the first horizontal hoisting arm and the second horizontal hoisting arm after action, and is configured to limit a maximum velocity. A lifting and lowering velocity of each of the first vertical hoisting arm, the second vertical hoisting arm, the first horizontal hoisting arm and the second horizontal hoisting arm is related to the input torque of the actuator, therefore, an equivalent range of the velocity of each of the first vertical hoisting arm, the second vertical hoisting arm, the first horizontal hoisting arm and the second horizontal hoisting arm is calculated through a range of the input torque of the actuator. A third constraint is the input action constraint of each of the first vertical hoisting arm, the second vertical hoisting arm, the first horizontal hoisting arm and the second horizontal hoisting arm. A fourth constraint and a fifth constraint are configured to limit an initial state to be unequal to zero.

In formula (30), the tracking error is reduced and a response of the system is smoothed through tracking velocity error. Even in a case of parameter uncertainty and emerging external inference in control process, optimal trajectory tracking is ensured. Weight matrices $S_a$, $Q_a$, R will balance a final error, an operation error and the control input increment, and select parameters meeting a tracking performance expectation, realizing a closed-loop stability of the system in study.

The incremental model predictive control is a rolling optimization method. An optimal control parameter only affects a control performance, and does not affect feasibility and stability of the system. Therefore, a direct weighing is performed between the control performance, computational complexity and economy according to actual control problem. In an objective function, all objective performances are collected and expressed mathematically, parameters that can achieve expected performance and satisfy these conditions are selected.

It should be noted that for influence of constraints above on the optimization objective function, a size of a search space of an optimization problem is changed through changing each constraint. When the search space for optimal control is too small, a solution is not optimal, and even the control cannot be obtained when it is too extreme. When the system operates on a large scale, a challenge of a system hardware is also very severe, and even causes the system to exceed a physical limit, resulting in damage to the system hardware.

(5) Simulation Verification

In the simulation, a sampling interval is 0.1 s, a prediction time domain, which is equal to a control time domain, is 2 s, weigh coefficients are Q=diag{$10^2$, 1,$10^6$, 1,$10^5$, 1,$10^2$, 1}, S=$I_8$, and R=0.1$I_4$. The simulation under different wave conditions is performed, and is compared with linear quadratic regulator (LQR) control and proportional-integral-differential (PID) control. The effectiveness and prominence of the incremental model predictive control are verified by simulation.

Two types of waves are expressed as:

$$h_1 = -\sin(0.1t) \\ h_2 = \cos(0.1t) - 1 \quad (31)$$

Hoisting arm parameters are set as:

$$L = 54 \text{ m}, B = 20 \text{ m}, L_a = L_b = 8.5 \text{ m}, \text{arm stroke} = \pm 2.5 \text{ m} \\ m_p = 6t, m_a = 1.32t, m_b = 1.16t, g = 9.8 \text{ m/s}^2, \alpha_d = 0 \text{rad} \quad (32)$$

A response amplitude operator (ROA) of the ship is equivalent to a low-pass filter. Under the same waveform, inclination compensation reference tracks of the two ships are roughly the same, but have a certain time lag.

Figure 3:
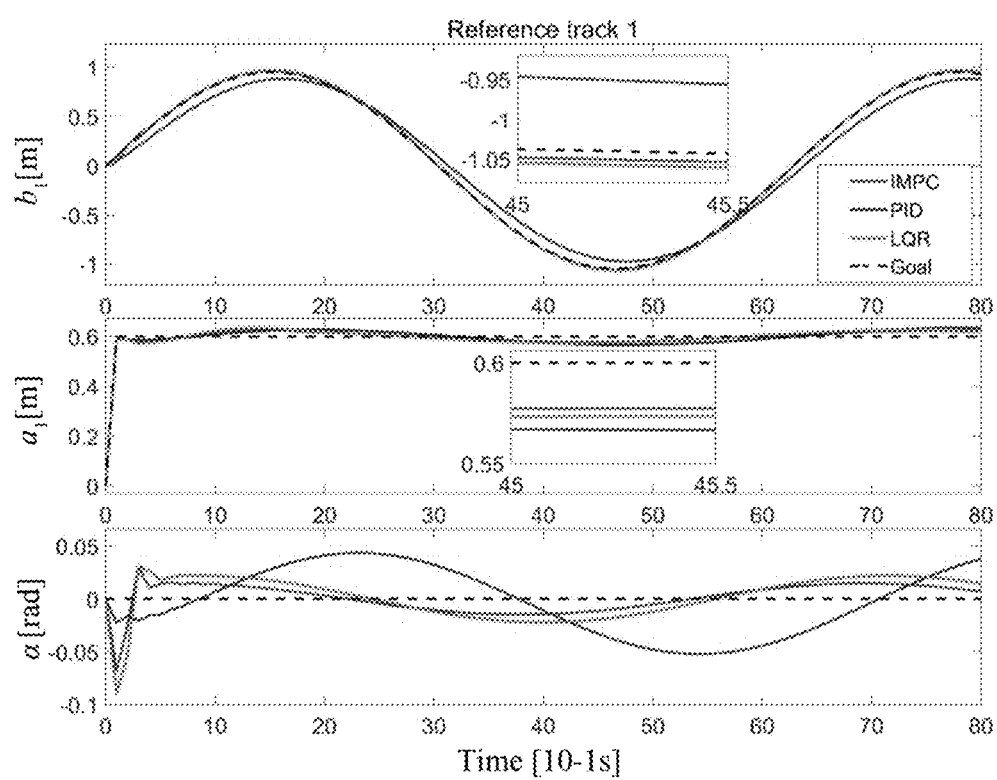
FIG. 3 schematically shows simulation effects of a reference track 1 and a load attitude angle according to Embodiment 1.
Figure 4:
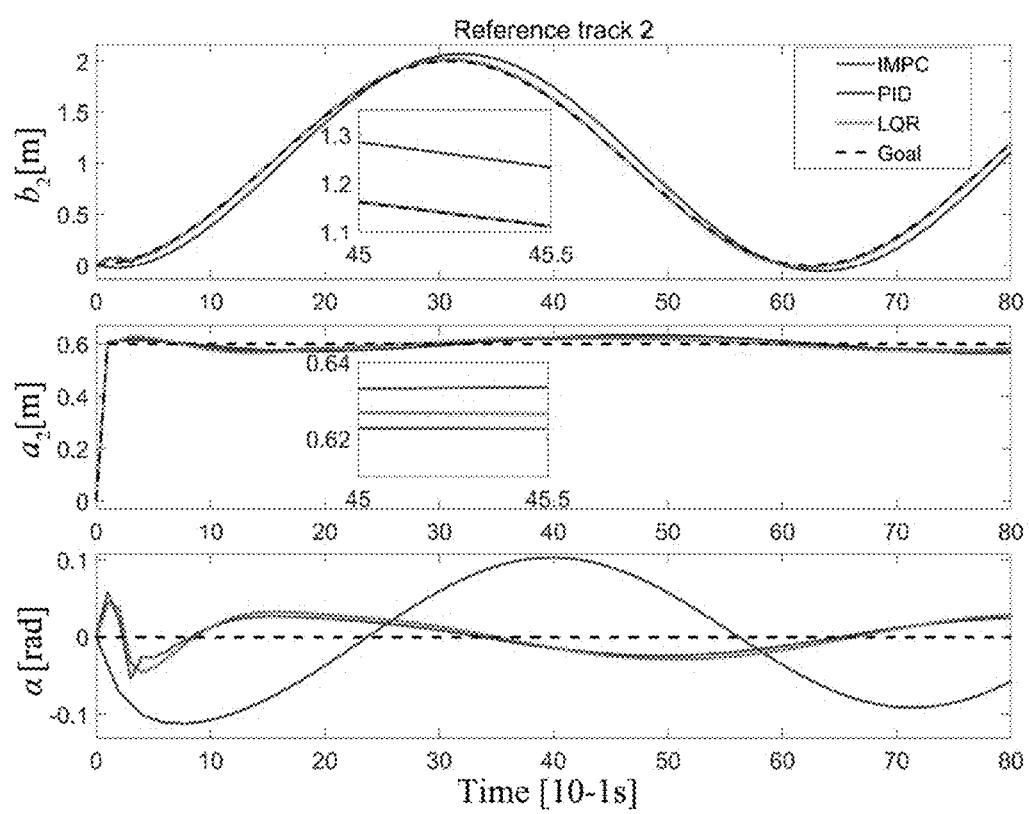
FIG. 4 schematically shows simulation effects of a reference track 2 and the load attitude angle according to Embodiment 1.

FIG. 3 shows three algorithms of waveform 1 including changes of the reference compensation trajectory of each of the first vertical hoisting arm, the second vertical hoisting arm, the first horizontal hoisting arm and the second horizontal hoisting arm and the load angle of the first ship when the two ships cooperate. FIG. 4 shows three algorithms of waveform 2 including changes of the reference compensation trajectory of each of the first vertical hoisting arm, the second vertical hoisting arm, the first horizontal hoisting arm and the second horizontal hoisting arm and the load angle of the second ship when the two ships cooperate. Table 1 shows a root-mean-square error (RMSE) for the changes of the reference compensation trajectory of each of the first vertical hoisting arm, the second vertical hoisting arm, the first horizontal hoisting arm and the second horizontal hoisting arm and the load angle of the first ship under the two waveforms controlled by the three algorithms. Simulation results show that compared with PID and LQR, the incremental model predictive control (IMPC) can significantly improve the offshore load stability in different waveforms.

TABLE 1

Performances of different controllers

| RMSE | IMPC | LQR | PID |
| --- | --- | --- | --- |
| Waveform 1: b1 compensation | 0.0078 | 0.0141 | 0.0845 |
| Waveform 2: b2 compensation | 0.0105 | 0.0148 | 0.0881 |
| Waveform 1: collaborative compensation$_\alpha$ | 0.0119 | 0.0176 | 0.0333 |
| Waveform 2: collaborative compensation$_\alpha$ | 0.0181 | 0.0211 | 0.0710 |

The method for collaborative heave compensation control of a dual ship-mounted hoisting arm system based on IMPC is provided in this embodiment. First, the 5-DOF non-linear dynamical model of the dual ship-mounted hoisting arm system based on the Lagrange method is proposed. Then, based on the heave motion prediction algorithm, the reference compensation trajectory of each of the first vertical hoisting arm, the second vertical hoisting arm, the first horizontal hoisting arm and the second horizontal hoisting arm is obtained. Based on the dynamical model, the reference compensation trajectory is tracked, and collaborative heave compensation control is realized under continuous wave interference, and the performance of collaborative heave compensation control is improved.

Embodiment 2

A system for collaborative heave compensation control of a dual ship-mounted hoisting arm system is provided, including a model building module and an optimization control module.

The model building module is configured to construct a dynamical model of the dual ship-mounted hoisting arm system according to a first state variable and a second state variable; where the first state variable includes a hoisting arm position and a hoisting arm velocity; and the second state variable is an attitude angle of a load of the dual ship-mounted hoisting arm system, which is expressed based on the hoisting arm position and the hoisting arm velocity.

The optimization control module is configured to obtain an optimal control strategy based on the dynamic model according to a control objective and an optimization objective under a plurality of constraint conditions, and control an action of each of the first vertical hoisting arm, the second vertical hoisting arm, the first horizontal hoisting arm and the second horizontal hoisting arm according to the optimal control strategy; wherein the control objective is to track a reference compensation trajectory of each of the first vertical hoisting arm, the second vertical hoisting arm, the first horizontal hoisting arm and the second horizontal hoisting arm during a heave motion process; the optimization objective is to minimize a tracking error; and the plurality of constraint conditions include a hoisting arm action constraint, and a hoisting arm position and velocity constraint after action.

It should be noted that the above modules correspond to the steps in Embodiment 1. Examples and application scenarios realized by the above modules and corresponding steps are the same, but not limiting to the disclosure in Embodiment 1. It should also be noted that the above modules, as a part of the system, can be executed in a computer system such as a group of computers that can execute instructions.

In some embodiment, an electronic device is provided, including a memory and a processor. A computer instruction is stored in the memory, and is configured to be operated by the processor. The computer instruction is configured to be operated by the processor to implement the method in Embodiment 1. For the sake of brevity, the details are not described here.

It should be noted that, in this embodiment, the processor can be a central processing unit (CPU), a general-purpose processor, a digital signal processor (DSP), an application specific integrated circuit (ASIC), a field programmable gate array (FPGA), a programmable logic device, a discrete gate or crystal valve logic devices, or a discrete hardware component. The general-purpose processor can be a microprocessor or any other conventional processors.

The memory includes a read-only memory and a random access memory, and provides instructions and data to the processor. A part of the memory includes a non-volatile random access memory. The memory can also store information of device type.

A non-transitory computer-readable storage medium is provided, and is configured to store the computer instruction. The computer instruction is configured to be executed by a processor to implement the method in Embodiment 1.

The method in Embodiment 1 can be directly executed by a hardware processor or executed by a combination of a hardware in the processor and a software module. The software module can be located in a mature storage medium, such as a random access memory, a flash memory, a read-only memory, and a programmable read-only memory or electrically erasable programmable memory in the field. The mature storage medium is located in the memory. The processor reads the information in the memory, and combines with its hardware to complete the steps of the above method. To avoid repetition, the details are not described here.

A computer program product is provided, including a computer program. The computer program is configured to be executed by a processor to implement the method in Embodiment 1.

The present disclosure also provides at least one product of computer program, which is physically stored in a non-transient computer readable storage medium. The product of computer program includes a computer executable instruction. For example, the product of computer program includes an instruction in a program module. The instruction in the program module is executed in a real or virtual processor of an objective to perform a process/method described above. Generally, the program module includes routines, programs, libraries, objects, classes, components, and data structures for executing specific tasks or implementing specific abstract data types. In some embodiments, functions of the program module can be combined or split between the program modules as required. A machine-executable instruction of the program module can be executed locally or within a distributed device. In the distributed device, the program module can be located locally, or in a remote storage medium.

A computer program code for implementing the method of the present disclosure can be written in one or more programming languages. The computer program code can be provided to general purpose computers, special-purpose computers, or other programmable data processing devices, so that the computer program code is executed by a computer or other programmable data processing devices to cause functions/operations specified in a flow chart and/or block diagram to be performed. The computer program code can be executed entirely on the computer, partly on the computer, as a stand-alone package, partly on the computer and partly on a remote computer, or entirely on a remote computer or a server.

In this description, the computer program code or other related data can be carried by any appropriate carrier to enable a device, equipment or processor to perform various processes and operations described above. Carrier includes a signal and a computer readable media. The signal includes electricity, light, radio, sound and other forms of transmission signal, such as a signal carrier and an infrared signal.

It should be noted by those of ordinary skill in the art that units and algorithmic steps in embodiments of the present disclosure can be realized electronic hardware or a combination of computer software and electronic hardware. Whether the functions are performed in hardware or software depends on the specific application and design constraints of the technical solutions. Those of professional skill in the art can use different methods to realize described functions for each particular application, and such implementation shall not be regarded as beyond the scope of this application defined by the appended claims.

Described above are specific embodiments of the present disclosure, which are not intended to limit the disclosure. It should be noted that various modifications and transformations made by those of ordinary skill in the art based on technical solutions of the present disclosure without departing the spirit of the present disclosure, shall fall within the scope of this application defined by the appended claims.

What is claimed is:

1. A method for collaborative heave compensation control of a dual ship-mounted hoisting arm system, the dual ship-mounted hoisting arm system comprising a first vertical hoisting arm, a second vertical hoisting arm, a first horizontal hoisting arm and a second horizontal hoisting arm, and the method comprising:

constructing a dynamic model of the dual ship-mounted hoisting arm system according to a first state variable and a second state variable; wherein the first state variable represents a position and velocity of each of the first vertical hoisting arm, the second vertical hoisting arm, the first horizontal hoisting arm and the second horizontal hoisting arm; and the second state variable is an attitude angle of a load of the dual ship-mounted hoisting arm system, and is expressed based on the position and velocity of each of the first vertical hoisting arm, the second vertical hoisting arm, the first horizontal hoisting arm and the second horizontal hoisting arm;

based on the dynamic model, obtaining an optimal control strategy according to a control objective and an optimization objective under a plurality of constraint conditions; wherein the control objective is to track a reference compensation trajectory of each of the first vertical hoisting arm, the second vertical hoisting arm, the first horizontal hoisting arm and the second horizontal hoisting arm during a heave motion process; the optimization objective is to minimize a tracking error; and the plurality of constraint conditions comprise an action constraint of each of the first vertical hoisting arm, the second vertical hoisting arm, the first horizontal hoisting arm and the second horizontal hoisting arm, and a position and velocity constraint of each of the first vertical hoisting arm, the second vertical hoisting arm, the first horizontal hoisting arm and the second horizontal hoisting arm after action; and controlling an action of each of the first vertical hoisting arm, the second vertical hoisting arm, the first horizontal hoisting arm and the second horizontal hoisting arm;

wherein the attitude angle α of the load is expressed as:

$$\dot{\alpha} = \dot{g}(a_1)\dot{a}_1 + \dot{g}(b_1)\dot{b}_1 + \dot{g}(b_2)\dot{b}_2 + \dot{g}(a_2)\dot{a}_2;\text{ and}$$

the dynamic model is simplified into:

$$M(q_i)\ddot{q}_i + C(q_i, \dot{q}_i)\dot{q}_i + G(q_i) = f_i\ i = 1, 2, 3, 4;$$

$$M(q_i) = N^T M(q_j) N,\ C(q_i, \dot{q}_i) = N^T C(q_j, \dot{q}_j) N;$$

$$G(q_i) = N^T G(q_j),\ f_i = N^T f_j;$$

and $$N = \begin{bmatrix} 1 & 0 & 0 & 0 \\ 0 & 1 & 0 & 0 \\ 0 & 0 & 1 & 0 \\ 0 & 0 & 0 & 1 \\ \dot{g}(a_1) & \dot{g}(b_1) & \dot{g}(b_2) & \dot{g}(a_2) \end{bmatrix};$$

wherein $a_1$ represents a stroke of the first horizontal hoisting arm; $a_2$ represents a stroke of the second horizontal hoisting arm; $b_1$ represents a stroke of the first vertical hoisting arm; $b_2$ represents a stroke of the second vertical hoisting arm; $\dot{a}_1$ represents a velocity of the first horizontal hoisting arm; $\dot{a}_2$ represents a velocity of the second horizontal hoisting arm; $\dot{b}_1$ represents a velocity of the first vertical hoisting arm; $\dot{b}_2$ represents a velocity of the second vertical hoisting arm; $\dot{g}(a_1)$ represents a partial derivative of a function associated with hoisting arm stroke and the attitude angle of the load with respect to $a_1$; $\dot{g}(a_2)$ represents a partial derivative of the function with respect to $a_2$; $\dot{g}(b_1)$ represents a partial derivative of the function with respect to $b_1$; $\dot{g}(b_2)$ represents a partial derivative of the function with respect to $b_2$; $q_i = [a_1, b_1, a_2, b_2]$ represents the position of each hoisting arm; $M(q_i)$ represents an inertia matrix; $C(q_i, \dot{q}_i)$ represents a Coriolis matrix; $G(q_i)$ represents a gravity matrix; $f_i$ represents a control vector; $\ddot{q}_i$ represents a second-order derivative of $q_i$; and $\dot{q}_i$ represents a first-order derivative of $q_i$;

wherein the optimization objective is expressed as:

$$J = \frac{1}{2}q_a(N_p)^T S_a q_a(N_p) + \frac{1}{2}\sum_{k=0}^{N_p-1}(q_a(k)^T Q_a q_a(k) + \Delta f(k)^T R \Delta f(k));$$

wherein $\Delta f(k)$ represents an input increment; $q_q$ represents a state equation involving the input increment; $N_p$ represents a prediction horizon of model predictive control; $q_q(N_p)$ represents a value of the first state variable after $N_p$ iterative predictions; and $S_q$, $Q_q$ and $R$ are weight matrices;

wherein the plurality of constraint conditions are respectively expressed as:

$$\begin{cases} q_{min} \leq q(k+i) \leq q_{max} \text{ for } i = 1 \ldots N_c \\ \dot{q}_{min} \leq \dot{q}(k+i) \leq \dot{q}_{max} \text{ for } i = 1 \ldots N_c \\ f_{min} \leq f(k+i) \leq f_{max} \text{ for } i = 1 \ldots N_c \\ \tilde{q}(k) = q_a(k) \\ q_a(k+1) = A_a q_a(k) + B_a \Delta f(k) \text{ for } i = 1 \ldots N_c \end{cases};$$

wherein $q_{min}$ represents a minimum hoisting arm position, and $q_{max}$ represents a maximum hoisting arm position; $\dot{q}_{min}$ represents a minimum hoisting arm velocity, and $\dot{q}_{max}$ represents a maximum hoisting arm velocity; $f_{min}$ represents a minimum hoisting arm action input, and $f_{max}$ represents a maximum hoisting arm action input; $\tilde{q}(k)$ represents a variation tendency of the first state variable; $q_a(k)$ represents the first state variable involving an input increment at a time k; $q_a(k+1)$ represents the first state variable involving the input increment at a time k+1; $\Delta f(k)$ represents the input increment; $A_a$ represents a state-transition matrix of a state equation of the discretized model; $B_a$ represents an input matrix of the state equation of the discretized model; q(k+i) represents the first state variable involving the input increment at a time k+i; $\dot{q}(k+i)$ represents a first-order derivative of q(k+i); and f(k+i) represents a control input at the time k+i.

2. The method of claim 1, wherein $q_i$ is transformed into the first state variable $q_t$ through dimension expansion, expressed as:

$$q_t = [a_1, \dot{a}_1, b_1, \dot{b}_1, b_2, \dot{b}_2, a_2, \dot{a}_2]^T;$$

and a state equation is expressed as:

$$\dot{q}_t = F + Gf_i;$$

wherein $$f(i) = M(q_i)^{-1}(-C(q_i, \dot{q}_i)\dot{q}_i - G(q_i));$$

$$g(i) = M(q_i)^{-1} f_i,\ i = 1, 2, 3, 4;$$

$$F = [\dot{a}_1; f(1); \dot{b}_1; f(2); \dot{b}_2; f(3); \dot{a}_2; f(4)];$$

$$G = [0_{1\times 4}; g(1); 0_{1\times 4}; g(2); 0_{1\times 4}; g(3); 0_{1\times 4}; g(4)];$$

and $$F \in R^{8\times 1},\ G \in R^{8\times 4};$$

wherein F represents a dimension-expanded state transition matrix; G represents a dimension-expanded input matrix; f(1), f(2), f(3) and f(4) represent row vectors of a matrix f(i); and g(1), g(2), g(3) and g(4) represent row vectors of a matrix g(i).

3. The method of claim 1, further comprising:

subjecting the dynamic model to approximate linearization based on a real-time state variable and a real-time action input to obtain an approximately-linearized model;

wherein a state equation of the approximately-linearized model is expressed as:

$$\dot{q}_t = A_{(t)}q_t + B_{(t)}f_i;$$

and $$\begin{cases} A_{(t)} = \nabla_{q_t^*}[F + Gf_i]\mid_{(q_t^*, f_i^*)} \\ B_{(t)} = \nabla_{f_i^*}[F + Gf_i]\mid_{(q_t^*, f_i^*)} \\ A_{(t)} \in R^{8 \times 8}, B_{(t)} \in R^{8 \times 4} \end{cases}$$

wherein $q_t^*$ represents the real-time state variable; $f_i^*$ represents the real-time action input; A and B are discretized state-space model matrices; $q_t$ represents the first state variable; $f_i$ represents a control vector; $\dot{q}_t$ represents a first-order derivative of $q_t$; F represents a dimension-expanded state transition matrix; and G represents a dimension-expanded input matrix.

4. An electronic device, comprising:
a memory; and
a processor;
wherein a computer instruction is stored in the memory, and is configured to be operated by the processor to implement the method of claim 1.

5. A non-transitory-computer-readable storage medium, wherein the non-transitory computer-readable storage medium is configured to store a computer instruction; and the computer instruction is configured to be executed by a processor to implement the method of claim 1.

6. A computer program product, comprising:
a computer program;
wherein the computer program is configured to be executed by a processor to implement the method of claim 1.

7. A system for collaborative heave compensation control of a dual ship-mounted hoisting arm system, the dual ship-mounted hoisting arm system comprising a first vertical hoisting arm, a second vertical hoisting arm, a first horizontal hoisting arm and a second horizontal hoisting arm, and the system comprising:
a model building module; and
an optimization control module;
wherein the model building module is configured to construct a dynamic model of the dual ship-mounted hoisting arm system according to a first state variable and a second state variable; wherein the first state variable comprises a hoisting arm position and a hoisting arm velocity; and the second state variable is an attitude angle of a load of the dual ship-mounted hoisting arm system, which is expressed based on the hoisting arm position and the hoisting arm velocity; and
the optimization control module is configured to obtain an optimal control strategy based on the dynamic model according to a control objective and an optimization objective under a plurality of constraint conditions, and control an action of each of the first vertical hoisting arm, the second vertical hoisting arm, the first horizontal hoisting arm and the second horizontal hoisting arm according to the optimal control strategy;
wherein the control objective is to track a reference compensation trajectory of each of the first vertical hoisting arm, the second vertical hoisting arm, the first horizontal hoisting arm and the second horizontal hoisting arm during a heave motion process; the optimization objective is to minimize a tracking error; and the plurality of constraint conditions comprise a hoisting arm action constraint, and a hoisting arm position and velocity constraint after action;
wherein the attitude angle $\alpha$ of the load is expressed as:

$$\dot{\alpha} = \dot{g}(a_1)\dot{a}_1 + \dot{g}(b_1)\dot{b}_1 + \dot{g}(b_2)\dot{b}_2 + \dot{g}(a_2)\dot{a}_2;$$ and the dynamic model is simplified into:

$$M(q_i)\ddot{q}_i + C(q_i, \dot{q}_i)\dot{q}_i + G(q_i) = f_i, \ i = 1, 2, 3, 4;$$

$$M(q_i) = N^T M(q_j) N, \ C(q_i, \dot{q}_i) = N^T C(q_j, \dot{q}_j) N;$$

$$G(q_i) = N^T G(q_j), \ f_i = N^T f_j;$$ and $$N = \begin{bmatrix} 1 & 0 & 0 & 0 \\ 0 & 1 & 0 & 0 \\ 0 & 0 & 1 & 0 \\ 0 & 0 & 0 & 1 \\ \dot{g}(a_1) & \dot{g}(b_1) & \dot{g}(b_2) & \dot{g}(a_2) \end{bmatrix};$$

wherein $a_1$ represents a stroke of the first horizontal hoisting arm; $a_2$ represents a stroke of the second horizontal hoisting arm; $b_1$ represents a stroke of the first vertical hoisting arm; $b_2$ represents a stroke of the second vertical hoisting arm; $\dot{a}_1$ represents a velocity of the first horizontal hoisting arm; $\dot{a}_2$ represents a velocity of the second horizontal hoisting arm; $\dot{b}_1$ represents a velocity of the first vertical hoisting arm; $\dot{b}_2$ represents a velocity of the second vertical hoisting arm; $\dot{g}(a_1)$ represents a partial derivative of a function associated with hoisting arm stroke and the attitude angle of the load with respect to $a_1$; $\dot{g}(a_2)$ represents a partial derivative of the function with respect to $a_2$; $\dot{g}(b_1)$ represents a partial derivative of the function with respect to $b_1$; $\dot{g}(b_2)$ represents a partial derivative of the function with respect to $b_2$; $q_i = [a_1, b_1, a_2, b_2]$ represents the position of each hoisting arm; $M(q_i)$ represents an inertia matrix; $C(q_i, \dot{q}_i)$ represents a Coriolis matrix; $G(g_i)$ represents a gravity matrix; $f_i$ represents a control vector; $\ddot{q}_i$ represents a second-order derivative of $q_i$; and $\dot{g}q_i$ represents a first-order derivative of $q_i$;
wherein the optimization objective is expressed as:

$$J = \frac{1}{2}q_a(N_p)^T S_a q_a(N_p) + \frac{1}{2}\sum_{k=0}^{N_p-1}\left(q_a(k)^T Q_a q_a(k) + \Delta f(k)^T R \Delta f(k)\right);$$

wherein $\Delta f(k)$ represents an input increment; $q_a$ represents a state equation involving the input increment; $N_p$ represents a prediction horizon of model predictive control; $q_q(N_p)$ represents a value of the first state variable after $N_p$ iterative predictions; and $S_a$, $Q_a$ and R are weight matrices;
wherein the plurality of constraint conditions are respectively expressed as:

$$\begin{cases} q_{min} \leq q(k+i) \leq q_{max} \text{ for } i = 1 \ldots N_c \\ \dot{q}_{min} \leq \dot{q}(k+i) \leq \dot{q}_{max} \text{ for } i = 1 \ldots N_c \\ f_{min} \leq f(k+i) \leq f_{max} \text{ for } i = 1 \ldots N_c \\ \tilde{q}(k) = q_a(k) \\ q_a(k+1) = A_a q_a(k) + B_a \Delta f(k) \text{ for } i = 1 \ldots N_c \end{cases};$$

wherein $q_{min}$ represents a minimum hoisting arm position, and $q_{max}$ represents a maximum hoisting arm position; $\dot{q}_{min}$ represents a minimum hoisting arm velocity, and $\dot{q}_{max}$ represents a maximum hoisting arm velocity; $f_{min}$ represents a minimum hoisting arm action input, and $f_{max}$ represents a maximum hoisting arm action input; $\tilde{q}(k)$ represents a variation tendency of the first state variable; $q_a(k)$ represents the first state variable involving an input increment at a time k; $q_a(k+1)$ represents the first state variable involving the input increment at a time k+1; $\Delta f(k)$ represents the input increment; $A_a$ represents a state-transition matrix of a state equation of the discretized model; $B_a$ represents an input matrix of the state equation of the discretized model; $q(k+i)$ represents the first state variable involving the input increment at a time k+i; $\dot{q}(k+i)$ represents a first-order derivative of $q(k+i)$; and $f(k+i)$ represents a control input at the time k+i.

* * * * *